United States Patent

Bonk

[15] 3,643,560
[45] Feb. 22, 1972

[54] EXPOSURE TIME SETTING DEVICE FOR A PHOTOGRAPHIC CAMERA WITH A FROSTED GLASS PLATE PRECISION SETTING AND AN ELECTRONIC TIME SETTING ARRANGEMENT

[72] Inventor: Heinrich Sylvester Bonk, Calmbach, Germany

[73] Assignee: Prontor-Werk Alfred Gauthier, GmbH, Calmbach Black Forest, Germany

[22] Filed: June 24, 1969

[21] Appl. No.: 836,081

[30] Foreign Application Priority Data

July 2, 1968 Germany .....................P 17 72 777.4

[52] U.S. Cl. ..................................95/10 C, 95/42, 356/226
[51] Int. Cl. .........................................G01j 1/44, G03b 7/08
[58] Field of Search............................95/10 C, 42, 53, 53 E; 356/218, 219, 225, 226, 227

[56] References Cited

UNITED STATES PATENTS

| 3,063,354 | 11/1962 | Matulik et al. | 95/10 C |
| 3,100,429 | 8/1963 | Koch | 95/10 C |
| 3,227,056 | 1/1966 | Lieser | 95/10 C |
| 3,257,919 | 6/1966 | Sato et al. | 95/10 C |
| 3,291,022 | 12/1966 | Brown | 95/10 C X |
| 3,460,451 | 8/1969 | Starp et al. | 95/10 C |
| 3,518,927 | 7/1970 | Mehlitz et al. | 95/10 C |

FOREIGN PATENTS OR APPLICATIONS

| 54,186 | 11/1967 | Germany | 95/53 E |
| 162,049 | 2/1958 | Sweden | 356/226 |

Primary Examiner—Joseph F. Peters
Attorney—March, Le Fever & Wyatt

[57] ABSTRACT

A device for the light dependent setting of the exposure time of a photographic camera having a frosted glass pane observation plane for controlling the exposure adjustment and an electronic time setting arrangement comprising resistance-capacitance members which are separately selectable in accordance with the photographic sensitivity of the exposed medium. The device has a funnel-shaped housing with an opening for the entry of light. The housing is adapted to be placed upon the frosted glass pane of the camera. Disposed inside the housing is a light sensitive element that is a component of a bridge circuit which also has an adjustable resistance and a meter movement coil. With these components, the resistance value corresponding to the degree of brightness of the frosted pane is determined and delivered to the circuit of the electronic time setting device by a switch arrangement and a wire connection.

7 Claims, 4 Drawing Figures

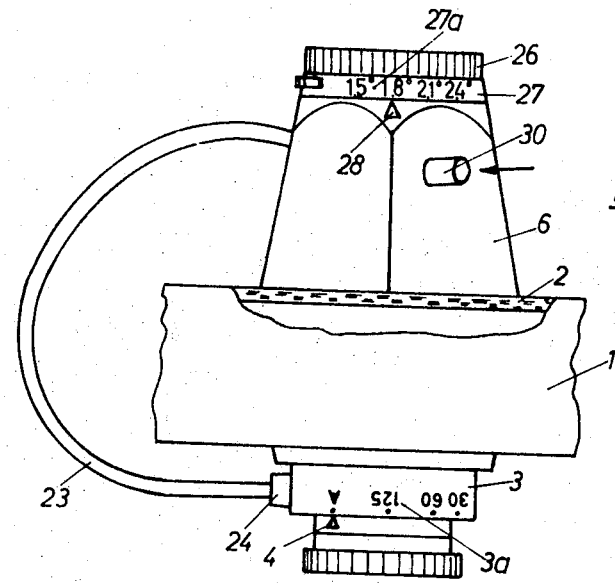
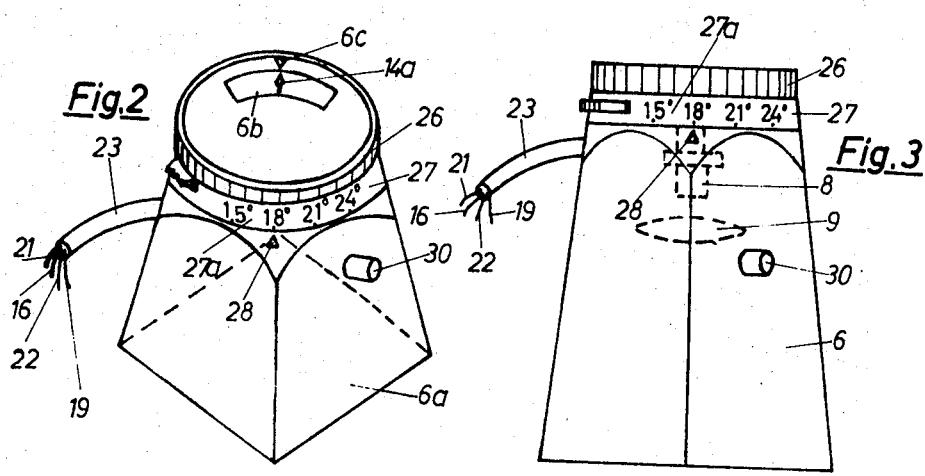
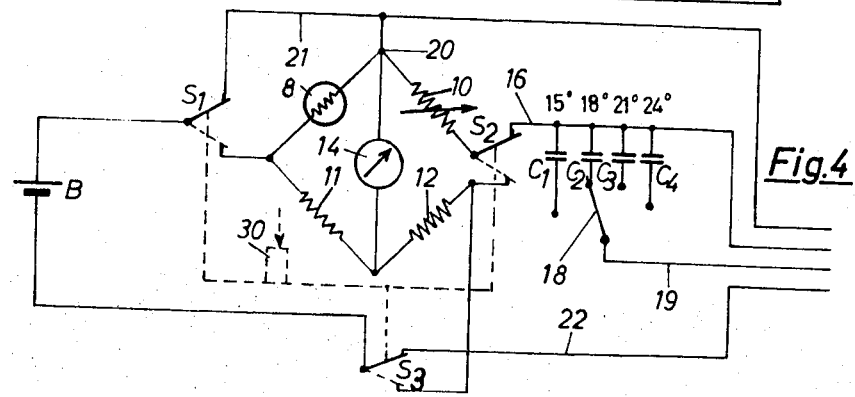
INVENTOR
Heinrich S. Bonk
BY
March, Le Fever, Wyatt & Lazar
ATTORNEYS 3,643,560

EXPOSURE TIME SETTING DEVICE FOR A PHOTOGRAPHIC CAMERA WITH A FROSTED GLASS PLATE PRECISION SETTING AND AN ELECTRONIC TIME SETTING ARRANGEMENT

This invention relates to an exposure time setting device for a photographic camera with a frosted glass plate precision setting and an electronic time setting arrangement. The invention provides an apparatus for light dependent exposure setting with an electronic time setting arrangement with resistance-capacitance segments referred to as RC members.

Photographic cameras of the type referred to above which permit the presetting of the exposure time merely by hand have already been developed with a supplementary device equipped with a photoresistance. By means of this supplementary device, the exposure time can be controlled automatically depending on the light conditions. Since this supplementary device is fitted on the outside of the camera, such as on an external toe fitting, the use of the camera is limited when it comes to taking pictures of very close objects or in microscope photography. The reason is that in such special picture taking not only the difference between the angle of view and the measurement angle, but also the parallax between camera objective and photoresistance introduce errors which may result in improper exposure.

It is an object of this invention to provide a supplementary device for a camera of the type referred to above with the aid of which it is possible to set the camera to the exact exposure time depending upon the light condition prevailing at the frosted glass plate.

It has now been found that the foregoing and related objects can be readily attained by means of a device in the form of a funnel-shaped housing with a light entry opening that can be attached to the frosted glass plate of the camera. Within the housing there is a light sensitive element which is part of an electrical bridge that includes a variable resistance and a moving coil instrument. With the aid of this bridge, the resistance corresponding to the light condition of the frosted glass pane can be determined and fed into the circuit of the electronic time setting device by means of a switching arrangement and a wire connection. This arrangement makes it possible by relatively simple means to close a gap in the application possibilities of a camera with a frosted glass pane precision setting and an electronic time setting device, inasmuch as these cameras, with the aid of the proposed attachment, can now be used also for very special tasks, such as taking close photographs and microscope photographs. By measuring the light condition at the frosted glass pane, the difference in the measurement angle-angle of view and the parallax are eliminated. Additionally, when using a bellow extension or adapter rings, the extension factor to be considered in the exposure time is entered automatically into the measurement result, which means that in this case the cumbersome calculation of exposure time becomes unnecessary.

In order to be able to use the exposure time setting device whenever negative material of differing film sensitivity is to be exposed, several condensers, each graduated to different load capacity relative to others, are provided to allow for the sensitivity of the plate or film material. The condensers are set according to the definite sensitivity value of the plate or film material by a setting device serving this purpose. Easy use of the device is achieved by the provision of a common setting key for the switch arrangement.

A particularly advantageous design of the exposure time setting device provides a setting key which upon release blocks the variable resistance. Thus an accidental change in the setting of the variable resistance after the measuring process is securely avoided in surprisingly simple fashion.

Other objects and advantages will be readily apparent from the following detailed specification and the drawings showing an illustrative embodiment of the invention wherein:

FIG. 1 is a partial top view of a photographic camera with frosted glass plate inserted in the backwall and with the exposure time setting device of this invention mounted on the frosted glass plate.

FIG. 2 is a perspective view of the setting device.

FIG. 3 is a side view of the setting device.

FIG. 4 is a diagrammatic view of the electric circuitry of the setting device, the dotted lines representing a mechanical connection for the common actuation of the change switches.

Referring now in detail to the drawings, FIG. 1 illustrates the housing of a photographic camera, designated by the reference numeral 1 which carries in the backwall a frosted glass pane 2 fitted for the precision setting of the objective. Furthermore, the camera is equipped with an electronic time setting device which is designed in a known manner and therefore not illustrated, as an electronic trip circuit having transistors as principal components and RC members to provide fixed exposure times. The electronic time setting device can be placed in the shutter housing 3. To set the exposure time desired, an indicator 4 is positioned opposite one of the values shown on the time exposure scale 3a fitted to the shutter housing 3 and the resistance controlling the exposure time set thereby becomes part of the circuit of the electronic time setting device. The indicator 4 can also be changed to a setting "A" in which all RC-members of the electronic time setting device are switched off.

As can be seen further from the drawing, it is possible to place upon the frosted glass pane 2 in the backwall of the camera a device which enables the operator to set the exposure time exactly according to the light condition prevailing at the frosted glass pane. In the illustrated embodiment, this device is formed by a funnel- or cone-shaped housing 6, which has an aperture 6a to allow the entry of light, the aperture 6a being adapted to the image aperture of the camera 1. A photoresistance 8 is provided in the funnel-shaped hollow space of housing 6 and a convergent lens 9 is placed before this photoresistance. The photoresistance is a component of a bridge circuit which is located in the housing 6 and which includes an adjustable resistance 10. The schematic drawing of this bridge circuit is illustrated in FIG. 4. One arm of the bridge contains the photoresistance 8 and the adjustable resistance 10 while the other arm of this circuit contains two fixed resistors of equal ohmic value. In the diagonal of the bridge is a moving coil instrument 14 which is used as a balancing apparatus.

As further illustrated in FIG. 4, three switches $S_1$, $S_2$ and $S_3$ are assigned to the bridge circuit and can be operated simultaneously. The bridge circuit is connected to a battery B by means of the switches $S_1$ and $S_3$. The switch $S_2$ serves to connect the adjustable resistance 10 located in one of the arms of the bridge either with the other arm or with a conductor 16 to which several condensers $C_1$ through $C_4$ of varying capacity are connected. The latter are provided in view of the differing sensitivity of negative materials. By means of a slide contact 18 one of the condensers $C_1$ through $C_4$ can be electrically connected to a conductor 19. Point 20 of the bridge circuit is attached to a conductor 21, which in turn can be connected to the battery B by the switch $S_1$. A conductor 22 is also connectable to the battery B by the switch $S_3$. The aforementioned conductors are grouped in a cable 23 which comes from the housing 6 and by means of a plug 24, the cable 23 can be connected to an outlet fitted on the camera which in turn is connected to the electronic time setting device located in the shutter housing.

A turnable knob-ring 26 attached to housing 6 is provided to adjust the resistance 10. The slide contact 18 can be moved by a further knob-ring 27 which bears a sensitivity scale 27a The values of this scale 27a have to be set against a fixed indicator 28 provided on the device. The balancing apparatus 14 shown schematically in FIG. 4 has a pointer 14a, which as illustrated in FIG. 2 is visible behind a window 6b and works with a fixed indicator 6c. To operate the previously mentioned switches $S_1$, $S_2$ and $S_3$, a button 30 is mounted on the housing 6. This button can actuate the movable contact parts of these switches by means of a mechanical connection indicated in FIG. 4 merely by dotted lines.

The operation and functioning of the above described exposure time setting device is as follows:

For microscope photography or taking pictures of very close objects with the exposure time set with the help of the aforementioned device, the device illustrated in FIGS. 1—4 is attached to the camera with its opening facing the frosted glass pane 2 and connected by the cable 23 to the electronic time setting apparatus outlet on the camera side. The indicator 4 on the shutter 3 is placed in the setting position "A" which causes the RC members of the electronic time setting arrangement to be switched off. Thereafter the shutter is opened, and for the duration of the measuring process it is kept in the open position. This is accomplished by operating the special opening device or "B" device usually present in shutters of plate cameras. For the purpose of measuring the brightness at the frosted glass pane 2, the button 30 is pressed which causes movement of the switches $S_1$, $S_2$ and $S_3$ into the dotted position in FIG. 4. In this position the bridge circuit is connected to the battery B and the adjustable resistance 10 is brought into the circuit. The light that falls through the objective opening upon the photoresistance 8 causes a deflection of the balancing apparatus 14 proportionate to the light intensity on the frosted glass pane 2. By turning knob-ring 26 the variable resistance 10 is set to the value of the photoresistance 8, that is the ring 26 is turned until the pointer 14a of the balancing apparatus returns to the center position marked by the indicator 6c. Thereupon the button 30 is released causing the switches $S_1$, $S_2$ and $S_3$ to return to the position shown in FIG. 4 by solid lines. In this position, the battery B is connected through the conductors 21 and 22 to the electronic time setting device in the shutter. Moreover, the resistance 10 set to the value of photoresistance 8 is also included in the circuit of the electronic time setting device through the conductor 16. The device is then removed from the frosted pane and the shutter is closed. Then, instead of the frosted pane 2, the negative material to be exposed in inserted. Thus, an exposure time is set for the following exposure process that corresponds exactly to the brightness measured at the frosted pane. The result is a perfectly exposed picture.

When using negative material of differing sensitivity it is merely necessary to set the knob 27 with the corresponding value on the scale to the indicator 28. Thereby the condenser assigned to the specific sensitivity value is tapped by means of the contact slide 18. To take different film sensitivities into consideration, a neutral wedge inserted ahead of photoresistance 8 may also be used. In this case only one condenser would be required. If finally one wishes to work with frosted panes of different optical density, then the indicator 28 could be adjustable opposite a corresponding scale, for the purpose of taking this factor into consideration.

In addition a blocking device can be connected to the button 30 which would block the setting mechanism for the adjustable resistance 10 when the button is not pressed, and would thereby preclude accidental shifting in the setting of this resistance.

I claim:

1. A device for the illumination dependent setting of the exposure time in a photographic camera with a frosted glass pane for an observation plane for controlling precision adjustment and an electronic time setting arrangement containing resistance and capacitive elements supported in a funnel-shaped housing having an opening for the entry of light, said housing being adapted to be placed on the frosted glass pane of the camera, a light sensitive element disposed in said housing, a bridge circuit for determining the resistance value corresponding to the degree of brightness of the frosted glass pane; said bridge circuit including said light sensitive element, an adjustable resistance and a meter movement coil; and circuit means connectable to said bridge circuit, said circuit means including a switch arrangement and conductive means for transmitting to the circuit of said electronic time setting arrangement of the camera the resistance value corresponding to the degree of brightness of said frosted glass pane.

2. The device of claim 1 further comprising, in order to take into consideration the sensitivity of the photographic surface, a plurality of capacitor elements which are graduated in size relative to each other according to their load capacity, and including adjusting contact means for selectively connecting selected individual capacitor elements to said circuit means to establish the exposure sensitivity value to that of the photographic surface employed.

3. The device of claim 1 wherein said switch arrangement is controlled by a common setting button.

4. The device of claim 3 comprising in addition a setting button to control the inclusion of said adjustable resistance upon the release of said button.

5. A device for the illumination dependent setting of the exposure time in a photographic camera with a frosted glass pane for an observation plane for controlling precision adjustment and an electronic time setting arrangement containing resistance and capacitive elements including a housing adapted to be placed on the frosted glass pane of the camera, said housing having an opening for the entry of light from said frosted glass pane, a light sensitive element disposed in said housing, a bridge circuit means for determining the resistance value of the light sensitive means corresponding to the degree of brightness of the frosted glass pane; said bridge circuit having a variable resistance in one of its arms and said light sensitive element in another adjacent arm and a fixed resistor in each other arm and a moving coil meter connected in the diagonal between the junctions of the fixed resistors and that of the variable resistance and the light sensitive element; and circuit means including a plurality of capacitor elements and a plurality of individually selectable switches for transmitting to the circuit of said electronic time setting arrangement of the camera the resistance value corresponding to the degree of brightness of said frosted glass pane.

6. The device of claim 5 wherein one of said switches selectively connects said arm having said adjustable resistance with a resistor in another arm in one position and with a capacitor element in another position, and wherein in order to take into consideration the sensitivity of the photographic surface, the plurality of capacitor elements are graduated in size relative to each other according to their load capacity and wherein an adjusting control switch contact means is provided for selectively connecting a selectable one of said capacitor elements to said circuit means to match the sensitivity value of the photographic surface employed.

7. The device of claim 6 wherein said plurality of control switches are operable by a common unicontrol setting button.

* * * * *